(12) United States Patent
Reece et al.

(10) Patent No.: US 11,279,103 B2
(45) Date of Patent: Mar. 22, 2022

(54) METHOD FOR PRODUCING CONTACT LENSES

(71) Applicant: Alcon Inc., Fribourg (CH)

(72) Inventors: Daryl Reece, Atlanta, GA (US); Uwe Haken, Norcross, GA (US); Delores Davis, Lawrenceville, GA (US)

(73) Assignee: Alcon Inc., Fribourg (CH)

( * ) Notice: Subject to any disclaimer, the term of this patent is extended or adjusted under 35 U.S.C. 154(b) by 362 days.

(21) Appl. No.: 15/782,579

(22) Filed: Oct. 12, 2017

(65) Prior Publication Data

US 2018/0104920 A1 Apr. 19, 2018

Related U.S. Application Data

(60) Provisional application No. 62/408,343, filed on Oct. 14, 2016.

(51) Int. Cl.
| | |
|---|---|
| *B29D 11/00* | (2006.01) |
| *G02C 7/04* | (2006.01) |
| *G02B 1/04* | (2006.01) |

(52) U.S. Cl.
CPC .... *B29D 11/00192* (2013.01); *B29D 11/0023* (2013.01); *B29D 11/0024* (2013.01);
(Continued)

(58) Field of Classification Search
CPC ..................... B29D 11/00192; B29D 11/00221
See application file for complete search history.

(56) References Cited

U.S. PATENT DOCUMENTS

| | | | | |
|---|---|---|---|---|
| 3,496,254 A | * | 2/1970 | Otto .................. | B29D 11/00115 264/2.1 |
| 4,136,250 A | * | 1/1979 | Mueller .............. | C08F 290/068 528/29 |

(Continued)

FOREIGN PATENT DOCUMENTS

| | | |
|---|---|---|
| EP | 0367513 A2 | 5/1990 |
| EP | 0227365 B1 | 2/1992 |

(Continued)

OTHER PUBLICATIONS

Machine Translation JP 2011-104792 A, Jun. 2, 2011 (Year: 2011).*

(Continued)

*Primary Examiner* — Benjamin A Schiffman

(74) *Attorney, Agent, or Firm* — Sheng-Hsin Hu

(57) ABSTRACT

The invention provides a method producing contact lenses, including the step of: holding the molded silicone hydrogel contact lens attached to the one of the female mold half or the male mold half with a vacuum supplied with a suction cup; deforming a surface of the one of the female mold half or the male mold half having the molded silicone hydrogel contact lens attached to with a pin so as to separate the molded silicone hydrogel contact lens from the mold half attached to and to transfer the molded silicone hydrogel contact lens to the suction cup; moving the suction cup away from the pin while the suction cup continues to hold the molded silicone hydrogel contact lens remains; applying a compressed gas to blow the molded silicone hydrogel contact lens away from the suction cup into a container.

5 Claims, 7 Drawing Sheets

(52) U.S. Cl.
CPC .......... *B29D 11/00221* (2013.01); *G02C 7/04* (2013.01); *G02B 1/043* (2013.01)

(56) References Cited

U.S. PATENT DOCUMENTS

| | | | |
|---|---|---|---|
| 4,153,641 A * | 5/1979 | Deichert | C08G 77/20 526/264 |
| 4,251,474 A * | 2/1981 | Blandin | B29C 33/0038 249/187.1 |
| 4,347,198 A * | 8/1982 | Ohkada | B29D 11/00125 264/1.1 |
| 4,444,711 A | 4/1984 | Schad | |
| 4,460,534 A | 7/1984 | Boehm | |
| 4,680,336 A * | 7/1987 | Larsen | G02B 1/043 524/548 |
| 4,740,533 A * | 4/1988 | Su | C08F 299/08 523/106 |
| 4,786,444 A | 11/1988 | Hwang | |
| 4,889,664 A * | 12/1989 | Kindt-Larsen | B29D 11/00038 264/2.6 |
| 4,931,228 A | 6/1990 | Keeley | |
| 4,955,580 A * | 9/1990 | Seden | A45C 11/005 249/82 |
| 5,143,660 A * | 9/1992 | Hamilton | B29C 35/0227 156/69 |
| 5,160,749 A * | 11/1992 | Fogarty | B29C 33/40 425/412 |
| 5,260,000 A * | 11/1993 | Nandu | B29D 11/00932 264/2.1 |
| 5,264,161 A * | 11/1993 | Druskis | B29D 11/00192 134/25.4 |
| 5,271,875 A * | 12/1993 | Appleton | B29C 33/0038 264/2.3 |
| 5,690,973 A * | 11/1997 | Kindt-Larsen | B29C 33/048 425/436 R |
| 5,693,268 A | 12/1997 | Widman et al. | |
| 5,820,895 A * | 10/1998 | Widman | B29C 37/0003 425/436 R |
| 5,843,346 A | 12/1998 | Morrill | |
| 5,850,107 A | 12/1998 | Kindt-Larsen et al. | |
| 5,894,002 A | 4/1999 | Boneberger et al. | |
| 5,935,492 A | 8/1999 | Martin et al. | |
| 6,012,471 A | 1/2000 | Calvin et al. | |
| 6,033,603 A | 3/2000 | Lesczynski et al. | |
| 6,039,913 A | 3/2000 | Hirt et al. | |
| 6,347,870 B1 | 2/2002 | Laruffa | |
| 6,428,723 B1 | 8/2002 | Lesczynski et al. | |
| 6,502,009 B1 | 12/2002 | Parnell, Sr. et al. | |
| 6,511,671 B1 | 1/2003 | Dubief et al. | |
| 6,558,584 B1 | 5/2003 | O'Neill et al. | |
| 6,638,451 B1 * | 10/2003 | Hagmann | B29C 33/40 264/1.1 |
| 6,908,575 B2 * | 6/2005 | Nakabayashi | B29C 33/44 264/1.1 |
| 2001/0037001 A1 | 11/2001 | Muller et al. | |
| 2002/0145211 A1 | 10/2002 | Pegram et al. | |
| 2003/0160343 A1 | 8/2003 | Hodgkinson | |
| 2004/0061246 A1 | 4/2004 | Cardiff | |
| 2005/0212155 A1 | 9/2005 | Matsuzawa et al. | |
| 2006/0202367 A1 * | 9/2006 | Knutzen | B29D 11/00221 264/1.32 |
| 2007/0114685 A1 * | 5/2007 | Wardrop | B29D 11/00192 264/1.32 |
| 2010/0044893 A1 | 2/2010 | Biel et al. | |
| 2011/0058927 A1 | 3/2011 | Biel et al. | |
| 2011/0089586 A1 * | 4/2011 | Biel | B29C 37/005 264/1.1 |
| 2014/0175685 A1 * | 6/2014 | Huang | B29D 11/00192 264/2.6 |
| 2018/0104919 A1 * | 4/2018 | Lu | B29C 33/48 |

FOREIGN PATENT DOCUMENTS

| | | | | |
|---|---|---|---|---|
| EP | 0657264 B1 | 6/1995 | | |
| EP | 0686490 B1 | 1/2003 | | |
| EP | 0811475 B1 | 1/2003 | | |
| EP | 0799689 B1 | 6/2003 | | |
| JP | 2003103537 A | 4/2003 | | |
| JP | 2011104792 A * | 6/2011 | ....... | B29D 11/00192 |
| JP | 2011104792 A | 6/2011 | | |
| WO | 1987004390 A1 | 7/1987 | | |
| WO | 98/19854 A1 | 5/1998 | | |
| WO | 00/18568 A1 | 4/2000 | | |
| WO | 01/15888 A1 | 3/2001 | | |
| WO | 2001030558 A1 | 5/2001 | | |
| WO | 2005011966 A1 | 2/2005 | | |

OTHER PUBLICATIONS

Machine Translation (JPO) of JP 2011-104792 A, Jun. 2, 2011 (Year: 2011).*

Partial human translation of JP 2011-104792 A, Jun. 2, 2011 (Year: 2011).*

Wichterle, Otto, and Drahoslav Lim. "Hydrophilic gels for biological use." Nature 185.4706 (Jan. 9, 1960): 117-118. (Year: 1960).*

Wikipedia, Polyhydroxyethylmethacrylate, https://en.wikipedia.org/w/index.php?title=Polyhydroxyethylmethacrylate&oldid=1003941551, retrieved Apr. 7, 2021 (Year: 2021).*

* cited by examiner

METHOD FOR PRODUCING CONTACT LENSES

This application claims the benefits under 35 USC § 119 (e) of U.S. provisional application No. 62/408,343 filed 14 Oct. 2016, herein incorporated by reference in its entirety.

The present invention is related to an improved method for producing contact lenses, in particular silicone hydrogel contact lenses.

BACKGROUND OF THE INVENTION

Contact lenses, such as silicone hydrogel contact lenses, can be manufactured economically in large numbers by a conventional full-mold process involving disposable molds, the examples of which are disclosed in, for example, PCT patent application publication no. WO/87/04390, in EP-A 0 367 513 or in U.S. Pat. No. 5,894,002. In a conventional molding process, a predetermined amount of a polymerizable or crosslinkable material typically is introduced into a disposable mold including a female (concave) mold half and a male (convex) mold half. The female and male mold halves cooperate with each other to form a mold cavity having a desired geometry for a contact lens. A minor surplus of polymerizable or crosslinkable material may be used so that when the male and female halves of the mold are closed it is ensured that the mold cavity is completely filled, and any excess amount of the material is expelled out into an overflow area adjacent to the mold cavity. The polymerizable or crosslinkable material remaining within the mold is polymerized or cross-linked by means of actinic radiation (e.g., UV irradiation, ionized radiation, microwave irradiation or by means of heating. Both the starting material in the mold cavity and the excess material in the overflow area are thereby hardened. Subsequently, the mold is opened and the polymerized but as yet unhydrated contact lens is removed and further processed.

Unfortunately, it is often not possible to predict reliably to which of the two mold halves the contact lens will adhere: in some cases it adheres to the male mold half (mold half with the convex optical molding surface) and, in others, it stays in the female mold half (mold half with the concave optical molding surface). After opening of the mold, therefore, a check generally needs to be made to discover on or in which mold half the polymerized but as yet unhydrated contact lens is located.

After mold separation, the lens on its respective mold half (male or female) together may be subjected to partial extraction or washing with an organic solvent (e.g., IPA (isopropyl alcohol)). This is done because the lens is difficult to be removed from the mold half due to a strong adhesion between the lens and the mold half. It is believed that this strong adhesion is due to the tackiness of the surface of the lens, such as a silicone hydrogel lens, so produced. If the lens is removed from the mold half by force, the lens can adhere to itself (curl) and lens handling can be difficult, and/or the lens can be damaged or torn due to extreme surface tackiness and strong adhesion to the surface of the mold half. The partial or initial washing with organic solvent can help deblock (or dislodge, or delens) the lens. The removed lens may further be subjected to other process, such as, for example, further extraction/washing, plasma treatment, hydration, sterilization, etc.

In general, extraction and equilibration of lenses are carried out in batch processes. There are some disadvantages associated with each lens associated with one mold half. First, mold halves takes up valuable space in an extraction or equilibration tank and therefore reduce the capacity of extraction which can be carried out in each tank. Second, flash (partially or fully cured lens forming material outside of the lens forming area of the mold) can be partially or completely dissolved in an extraction bath, which can potentially reduce extraction efficiency, or flash may be still attached to the lens even after extraction and equilibration, which may cause the lens to be rejected and reduce production. It would be desirable to have a step of removing, also known as "deblocking" or "dislodging" or "delensing", the lens from the lens-adhering mold half.

An organic solvent, such as, e.g., isopropyl alcohol (IPA), can be used to dislodge a silicone-hydrogel lens from its adhering mold half. The solvent swells the lens and helps reduce the forces holding the lens to the mold half surface. However, once a lens is swollen, the large size of the lens makes it difficult to handle due to lack of mechanical strength. In addition, the lens after swelling in an organic solvent (e.g., IPA) may still be sticky or tacky.

PCT published international patent application No. WO 01/30558 describes a different approach for dislodging a lens from its adhering mold half, by lowering the temperature of the contact lens with a cryogenic material to a temperature and for a time sufficient for the lens to release from its adhering mold half without the application of external forces. The lowering of the temperature of the contact lens is accomplished by direct or indirect contact with a cryogenic substance, such as liquid nitrogen, liquid helium, liquid carbon dioxide, or solid carbon dioxide ("dry ice"). When a cryogenic substance is used to cool down a silicone hydrogel lens below its glass transition temperature ($T_g$), the surface tackiness temporarily freezes. This makes the lens separate from the mold half because of reduction in the tackiness and probably lens size reduction. However, the lens after separation becomes tacky again in air, which makes the lens handling difficult. In addition, use of a cryogenic substance can increase product cost.

Therefore, there is a need not only to provide a process for casting molding contact lenses with enhanced quality and enhanced yield achieved by omitting the previously required check to discover on or in which mold half the contact lens is located after the mold has been opened, but also to provide a process which permits silicone hydrogel lens to be separated from lens adhering mold half, and does not require liquid soaks.

SUMMARY OF THE INVENTION

The invention is directed to a method for producing contact lenses, including:

a) providing a mold including a male mold half having a first molding surface and a female mold half having a second molding surface, wherein the male and female mold halves are configured to receive each other such that a mold cavity is formed between the first and second molding surfaces when the mold is closed;

b) dispensing an amount of a silicone hydrogel lens-forming material into the female mold half;

c) mating the male and female mold halves to close the mold;

d) curing the silicone hydrogel lens-forming material located in the mold cavity, thereby forming a molded silicone hydrogel contact lens;

e) separating the mold into the male and female mold halves, with the silicone hydrogel contact lens adhered on one of the male and female mold halves;

f) holding the molded silicone hydrogel contact lens attached to the one of the female mold half or the male mold half with a vacuum supplied with a suction cup;

g) deforming a surface of the one of the female mold half or the male mold half having the molded silicone hydrogel contact lens attached to with a pin so as to separate the molded silicone hydrogel contact lens from the mold half attached to and to transfer the molded silicone hydrogel contact lens to the suction cup;

h) moving the suction cup away from the pin while the suction cup continues to hold the molded silicone hydrogel contact lens remains;

i) applying a compressed gas to blow the molded silicone hydrogel contact lens away from the suction cup into a container.

The invention is also directed to an apparatus for delensing silicone hydrogel contact lenses from the lens adhering mold half, the apparatus comprising:

a mold half holder, wherein the mold half holder holding a molded silicone hydrogel contact lens seated on the top of one of the female mold half or the male mold half, a suction cup, wherein the suction cup connecting with the mold half holder and contacting the molded silicone hydrogel lens seated on the top of the mold half to which it is adhered, wherein the suction cup also connecting with a central channel which can be switched from vacuum pressure to compressed gas or vice versa, a pin-pushing device, wherein the pin-pushing device is located below the mold holder and has a pin; wherein the mold holder can be lowered to against the pin, thereby the pin deforms a surface of the one of the female mold half or the male mold half.

The present invention provides the foregoing and other features, and the advantages of the invention will become further apparent from the following detailed description of the presently preferred embodiments, read in conjunction with the accompanying figures. The detailed description and figures are merely illustrative of the invention and do not limit the scope of the invention, which is defined by the appended claims and equivalents thereof.

BRIEF DESCRIPTION OF THE DRAWINGS

FIG. 5 illustrates the pushing pin applying a force to deform the mold half which a contact lens attached to.

DESCRIPTION OF PREFERRED EMBODIMENTS

Figure 1:
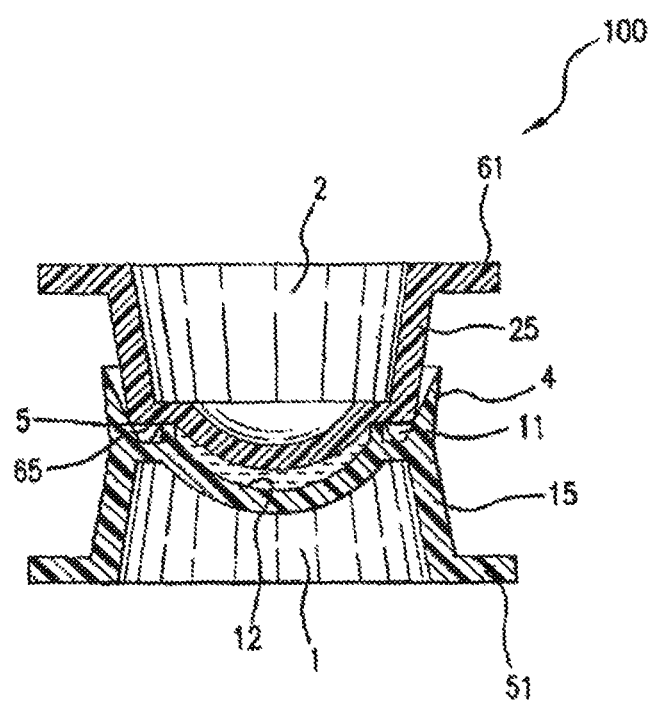
FIG. 1 is a cross-sectional view of a mold according to a preferred embodiment of the invention.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art.

Conventional methods are used for these procedures, such as those provided in the art and various general references. Where a term is provided in the singular, the inventors also contemplate the plural of that term.

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "silicone hydrogel" refers to a hydrogel obtained by copolymerization of a polymerizable composition including at least one silicone-containing vinylic monomer or at least one silicone-containing macromer.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylefinically unsaturated group" is employed herein in a broad sense and is intended to encompass any groups containing at least one $>C=C<$ group. Exemplary ethylenically unsaturated groups include without limitation acryloyl, methacryloyl, allyl, vinyl, styrenyl, or other $C=C$ containing groups.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" refers to a medium and high molecular weight compound or polymer that contains ethylenically unsaturated groups and can be polymerized actinically or thermally. Medium and high molecular weight typically means average molecular weights greater than 700 Daltons.

A "polymer" means a material formed by polymerizing/crosslinking one or more monomers, macromers and or oligomers.

"Molecular weight" of a polymeric material (including monomeric or macromeric materials), as used herein, refers to the number-average molecular weight unless otherwise specifically noted or unless testing conditions indicate otherwise.

As used herein, a "prepolymer" refers to a starting polymer which can be cured (e.g., crosslinked and/or polymerized) actinically or thermally to obtain a crosslinked and/or polymerized polymer having a molecular weight much higher than the starting polymer.

A "lens-forming material" refers to a polymerizable composition which can be cured (i.e., polymerized and/or crosslinked) thermally or actinically to obtain a crosslinked polymer. Lens-forming materials are well known to a person skilled in the art.

The invention is generally related to a method for separating mold and dislodging (or removing or de-blocking) of a silicone hydrogel contact lens from a mold after lens curing and before lens extraction. The invention is partly based on the discovery that use of deforming force, such as a straining/stretching force, or a compression force, applied against a non-optical surface of one of the mold halves, can be used efficiently to separate molds into mold halves and also used for dislodging a silicone-hydrogel lens from its adhering mold half, thereby increasing production yield.

Although the inventors do not wish to be bound by any particular theory, it is believed that due to the presence of seal between the male and female mold halves after curing a polymerizable material in the mold and of strong adhesion between the flash and the overflow area of the mold, an extra force is need to force separation of the mold halves from each other. Such extra force may cause lens damages, such as, fracture, tear etc. and thereby can have adverse impacts on the product yield and lens quality.

There are several advantages associated with a method of the invention. First, application of the deforming force to the non-optical side (or surface) of the mold half and use of a vacuum force enables a molded lens to be dislodged from its adhering mold half without tearing the lens. Second, lens dislodging by the mold-deforming force and vacuum force is a relatively fast process, for example, taking only a few seconds. Third, the present process permit silicone hydrogel lens to be separated from lens adhering mold half, and do not require liquid soaks. Fourth, without mold halves, an extraction tank can accommodate more lenses and product cost associated with extraction equipment can be decreased. In addition, removal of the flash and uncured polymerizable components can increase extraction efficiency.

Methods of manufacturing mold sections for cast molding a contact lens are generally well known to those of ordinary skill in the art. The process of the present invention is not limited to any particular method of forming a mold. In fact, any method of forming a mold can be used in the present invention. However, for illustrative purposes, the following discussion has been provided as one embodiment of forming a mold.

In general, a mold includes at least two mold sections (or portions) or mold halves, i.e. male and female mold halves. The male mold half defines a first molding (or optical) surface defining the posterior (concave) surface of a lens and the second mold half defines a second molding (or optical) surface defining the anterior (convex) surface of a lens. The first and second mold halves are configured to receive each other such that a lens forming cavity is formed between the first molding surface and the second molding surface. The molding surface of a mold half is the cavity-forming surface of the mold and in direct contact with lens-forming material.

FIG. 1 schematically illustrates a preferred mold 100 used in the methods and apparatus of the invention. The mold 100 includes a female mold half 1 and male mold half 2.

The male mold half 2 includes a base 61, a substantially cylindrical body 25 which extends upward from base 61, a generally convexly-shaped optical molding surface defining the posterior (concave) surface of a molded contact lens, and an annular shoulder 65 which surrounds the optical molding surface. The optical molding surface of the male mold half protrudes outward from the top of body 25. The annular shoulder 65 shown is flat. It is understood that the annular should 65 can have any suitable surface, such as, e.g., a tilted surface. The male mold half also has a non-optical mold surface, which is the generally concave-shaped area or surface on the opposite side from the convexly-shaped optical molding surface.

The female mold half 1 includes a base 51, a substantially cylindrical body 15 which extends upward from base 51, a generally concave-shaped optical molding surface defining the anterior (convex) surface of a molded contact lens, and a collar 4. The optical molding surface of the female mold half recesses downward from the top of the body 15. Collar 4 (or up-protruding flange) is preferably integral part of the female mold half 1 and protrudes upward from the top of the body 15. A circumferential groove (or recessed area) 11 is formed on top of the body 15 outside of the optical molding surface and functions as an overflow for any excess polymerizable lens-forming material. The female mold half also has a non-optical mold surface, which is the generally convexly-shaped area or surface on the opposite side from the concave-shaped optical molding surface.

The term "collar" as used herein refers to a peripheral circular part which protrudes upward from the top of body of one of the two mating mold halves. A collar can be attached to or preferably be an integral part of that mold half and which can encircle the other mold half to provide a tight seal between the two mold halves. It is understood that the collar can be provided on either of the male and female mold halves.

The female mold half 1 and a male mold half 2 are configured to receive each other such that a contact lens forming cavity 12 is formed between the optical molding surfaces of the male mold half and the female mold half. The collar 4 encircles the body 25 of the male mold half 2 to provide a tight seal 5 between the female and male mold halves when the mold is closed. Typically, there is no lens material in the seal.

In operation, mold halves 1 and 2 can be first injection molded from a plastic resin in an injection molding apparatus, as well known to a person skilled in the art. A specific amount, e.g., an amount sufficient to fill the mold cavity without introducing too much waste, of a polymerizable lens-forming material is typically dispensed into the female mold half 1 by means of a dispensing device. Thereafter, the male mold half 2 is put on and the mold 100 is closed (FIG. 1). As the mold 100 closes, if there is any excess polymerizable lens-forming material, it will be pressed into an overflow area 11 provided on the female mold half 1.

Subsequently, the closed mold 100 containing the polymerizable lens-forming material is subjected to actinic irradiation (e.g., UV radiation or visible light radiation), or heat radiation, at least in the region of the lens forming cavity 12. For this purpose, at least one of the mold halves is transparent to the actinic radiation (e.g., UV light) at least in the region of the molding surface. Thus, at least the polymerizable lens-form ing material in the lens forming cavity 12 is polymerized. It is also possible for any polymerizable lens-forming material in the overflow area 11 to be polymerized. This is advantageous in the respect that, when the mold is opened, the excess polymerized lens-forming material then remains in the overflow area 11 of the female mold half 1, while the contact lens adhering to the male mold half 2 can be removed and further processed together with male mold half 2.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, a silicone hydrogel lens-forming material includes at least one silicon-containing monomer or macromer, or can be any lens formulations for making soft contact lenses. Exemplary lens formulations include without limitation the formulations of lotrafilcon A, lotrafilcon B, etafilcon A, genfilcon A, lenefilcon A, polymacon, acquafilcon A, balafilcon, senofilcon A, and the like. A lens-forming material can further include other components, such as an initiator (e.g., a photoinitiator or a thermal initiator), a visibility tinting agent, UV-blocking agent, photosensitizers, and the like. Preferably, a silicone hydrogel lens-forming material used in the present invention includes a silicone-containing macromer or prepolymer.

Examples of silicone-containing vinylic monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tris (pentamethyldisiloxyanyl)-3-methacrylatopropylsilane (T2), and tristrimethylsilyloxysilylpropyl methacrylate (TRIS). A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy) silane.

Any suitable siloxane-containing macromer with ethylenically unsaturated group(s) can be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers that contain two or more polymerizable groups (vinylic groups) can also serve as cross linkers. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

Examples of silicone-containing prepolymers include without limitation those disclosed in US Patent Application Publication No. US 2001-0037001 A1 and U.S. Pat. No. 6,039,913, which are incorporated herein by references in their entireties. Preferably, the prepolymers used in the invention are previously purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents. The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

In accordance with the present invention, a silicone hydrogel lens-forming material can also include a hydrophilic vinylic monomer. Nearly any hydrophilic vinylic monomer that can act as a plasticizer can be used in the fluid composition of the invention. Among the preferred hydrophilic monomers are N,N-dimethylacrylamide (DMA), 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethylmethacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

A silicone hydrogel lens-forming material can also include a hydrophobic monomer. By incorporating a certain amount of hydrophobic vinylic monomer in a polymerizable fluid composition, the mechanical properties (e.g., modulus of elasticity) of the resultant polymer may be improved.

A silicone hydrogel lens-forming material can further include an antimicrobial agent, preferably antimicrobial metal nanoparticles, and more preferably silver nanoparticles.

In accordance with the present invention, a silicone hydrogel lens-forming material can be a solution or a solvent-free liquid or melt at a temperature below 90° C. A person skilled in the art will know well how to prepare silicone hydrogel lens-forming material.

In accordance with the present invention, a silicone hydrogel lens-forming material can be a solution or a solvent-free liquid or melt at a temperature below 60° C.

A specific amount of a polymerizable lens-forming material is typically dispensed into a female mold half by means of a dispensing device and then a male mold half is put on and the mold is closed. As the mold closes, any excess polymerizable lens-forming material is pressed into an overflow provided on the female mold half (or alternatively on the male mold half).

The closed mold containing the polymerizable lens-forming material subsequently is cured. A person skilled in the art knows well how to cure a lens-forming material. For example, a lens-forming material is subjected to actinic irradiation (e.g., UV radiation) at least in the region of the lens forming cavity or thermal treatment (e.g., heating in an oven) to form a lens. For actinic curing, at least one of the mold halves is transparent to the actinic radiation (e.g., UV light) at least in the region of the molding surface. Thus, at least the polymerizable lens-forming material in the lens forming cavity is polymerized. It is also possible for any polymerizable lens-forming material in the overflow to be polymerized. This is advantageous in the respect that, when the mold is opened, the excess polymerized lens-forming material then remains in the overflow of the female mold half, while the contact lens adhering to the male mold half can be removed and further processed together with male mold half.

Figure 2:
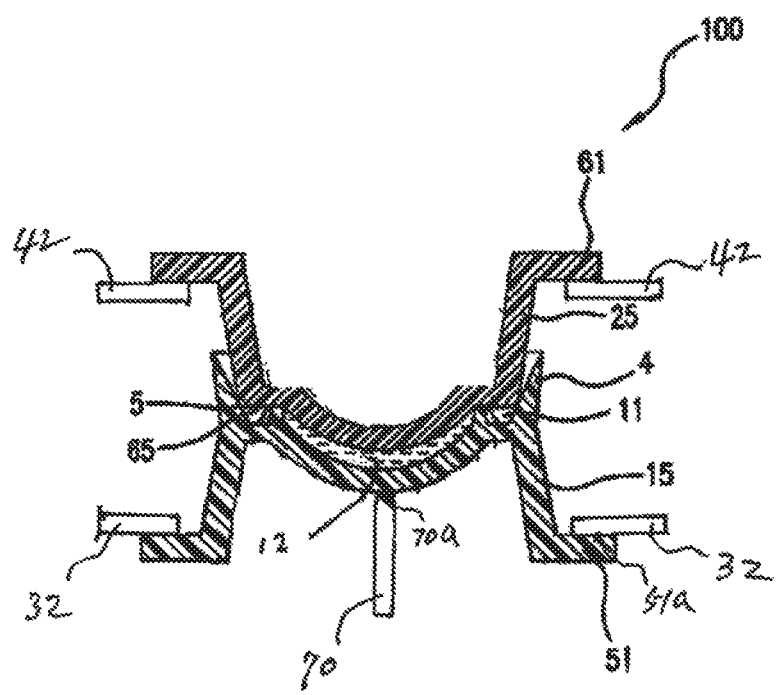
FIG. 2 illustrates schematically a process for separating the male and female mold halves of a lens-forming mold according to the invention and an apparatus for performing a method of the invention.

Subsequently, applying a force to non-optical surface of the female mold at a location about the center area of non-optical molding surface at an angle of less than about 30 degrees, preferably less than about 10 degrees, most preferably less than about 5 degrees (i.e., in a direction substantially normal to center area of non-optical molding surface) relative to the axis of the mold to deform the female mold surface which breaks the bonds between the optical molding surface of the female mold and the lens, as shown in FIG. 2. Various ways of applying a force to non-optical surface of the female mold at a location about the center area of non-optical molding surface along the axis of the mold to deform the female mold surface which breaks the bonds between the optical molding surface of the female mold and the lens. It is understood that the mold-opening device can have any configurations known to a person skilled in the art for performing the function of separating two mold halves from each other. For example, referring to FIG. 2, the demolding assembly includes a pin 70 positionable against the center area of non-optical molding surface of the female mold section. The pin 70 has a flat free end 70a to enable a surface contact between the free end 70a and the center area of non-optical molding surface of the female mold. It will be appreciated that the scope of the invention is not limited to such a particular flat configuration of the pin end 70a, for example the pin may have an outwardly rounded (convex) free end or concave-shaped free end, or other shape. In the present embodiment, the pin 70 is movable and the female mold remains stationary by applying a restraining force to female mold half applying a restraining force to female mold half with a first pry finger set 32 for maintaining the female mold half in a fixed position. However, it is possible to arrange the assembly so that the female mold is movable toward the pin 70 while the pin 70 remains stationary, or so that both the pin 70 and the female mold can be moved relative to each other.

In use, during the demolding operation, the free end 70a of the pin 70 applies a longitudinally directed force to the central portion of the non-optical surface of the female mold. The first pry finger set 32 applies a counteractive force against the end face 51a of the flange 51 of the female mold section 1, retaining the flange in place. Consequently, the female mold section is deformed by a compression force between the free end 70a of the pin 70 and the first finger 32. This force deforms the curved part of the female mold section and breaks or loosens the adhesive bond between the lens-forming optical surface of the female mold section 1 and the anterior surface of the lens 12.

Next, a vertical lifting movement is applied to the male mold half with a second pry finger set (while maintaining the restraints on the female mold half so as to effectuate gradual separation between the female mold half and the male mold half.

After separating the male mold and the female mold, the contact lens generally adheres to the male mold even though the molding surfaces of the female mold and male mold are not treated before or after dispensing a specific amount of a polymerizable lens-forming material into one of the mold halves to render the molded contact lens preferentially adhered to the female mold or male mold when separating the mold.

After breaking the bond between the optical molding surface of the female mold half and the lens, the mold is separated, with the molded contact lens adhering to the male mold half 2. It is surprising to find out that, according to the present invention, the molded contact lens adheres to the male mold half even though the molding surfaces of the female mold and male mold need not be treated to render the molded contact lens preferentially adhered to the female mold half or the male mold half when separating the mold.

Once the mold sections have been separated, as mentioned the lens will generally be adhered to the optical surface of the male mold section, when the initial deforming force is applied against the non-optical surface of the female mold half, and must therefore be released from (removed from) the male mold section. As mentioned above, the lens typically remains adhered to the male mold section. On the other hand, however, by using similar principle, it is possible to have the lens generally adhere to the female mold half instead of the male mold half, by inserting the mold (100) "upside-down oriented with the female mold half on top. In this case, the deforming force can be applied against the non-optical surface male mold half as a stretching or straining force applied along the longitudinal axis of the male mold half to deform the male mold half, while it is held in place by the first set of pry fingers. This breaks the bonds or adherence between the optical molding surface of the male mold half and the lens, thereby the lens adheres to the female mold when separating the mold.

FIGS. 3-7 illustrate a delensing process and apparatus.

Figure 3:
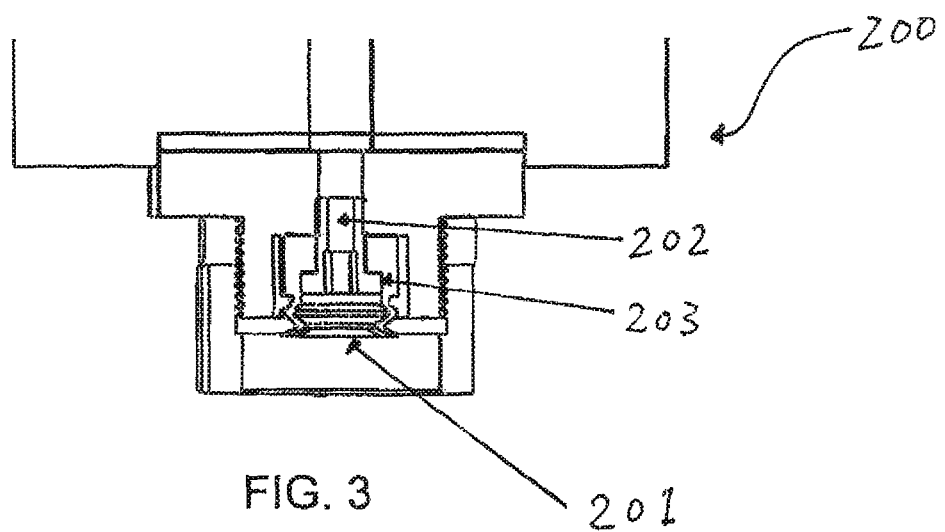
FIG. 3 illustrates a vacuum device with a suction cup.

FIG. 3 illustrates a part of delensing device (200) comprises a suction cup (203) and a mold half holder (201). The suction cup connects with a central channel (202) which can be switched from vacuum pressure to compressed gas or vice versa. The compressed gas can be air or an inert gas such as nitrogen, etc. A mold half holder (201) is also connects to the suction cup for holding a molded silicone hydrogel contact lens attached to the one of the female mold half or the male mold half with the central channel switches set to vacuum pressure.

The suction cup (203) is structured to contact the molded silicone hydrogel lens seated on the top of the mold half to which it is adhered without damaging the product, and may be formed from any suitable material such as soft rubber, silicone rubbers, or polymeric foam-type materials.

Figure 4:
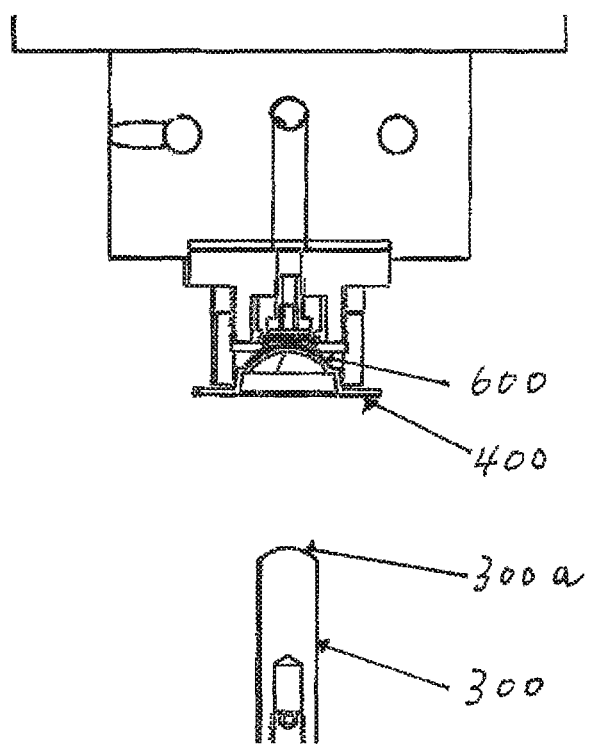
FIG. 4 illustrates a suction cup holding a contact lens which adhered to a mold half and a pushing pin located below, but not engaging to, the suction cup.

FIG. 4 illustrates a mold half holder holding a molded silicone hydrogel lens (600) which is adhered to a mold half (400) and a pushing pin (300) located below, but not engaging to, the suction cup.

Figure 5:
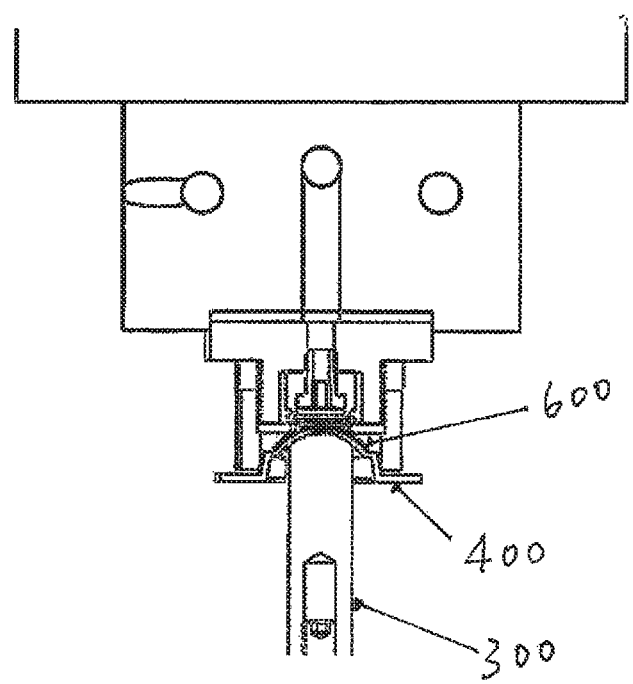

FIG. 5 illustrates the pushing pin (300) applying a force to deform the mold half (400) to which a contact lens is attached. The free end 300a of the pin 300 applies a longitudinally directed force to the central portion of the non-optical surface of the male mold half. The force deforms the curved part of the male mold section and breaks the adhesive bond between the lens-forming optical surface of the male mold half and the anterior surface of the lens. The push pin strikes the central portion of the non-optical surface of the male mold half up to 3 times.

Figure 6:
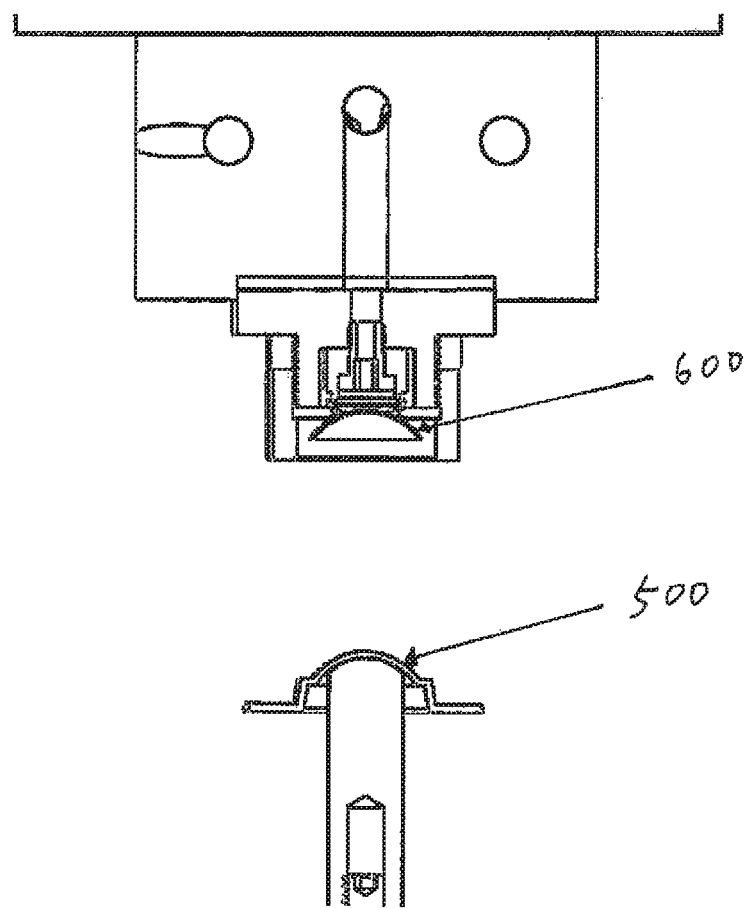
FIG. 6 Illustrates the deformed the mold half rest on the push pin when the suction cup moves upwards.

FIG. 6 illustrates the deformed mold half (500) rests on the push pin when the suction cup moves upwards and the suction cup continues to hold the molded silicone hydrogel contact lens.

Figure 7:
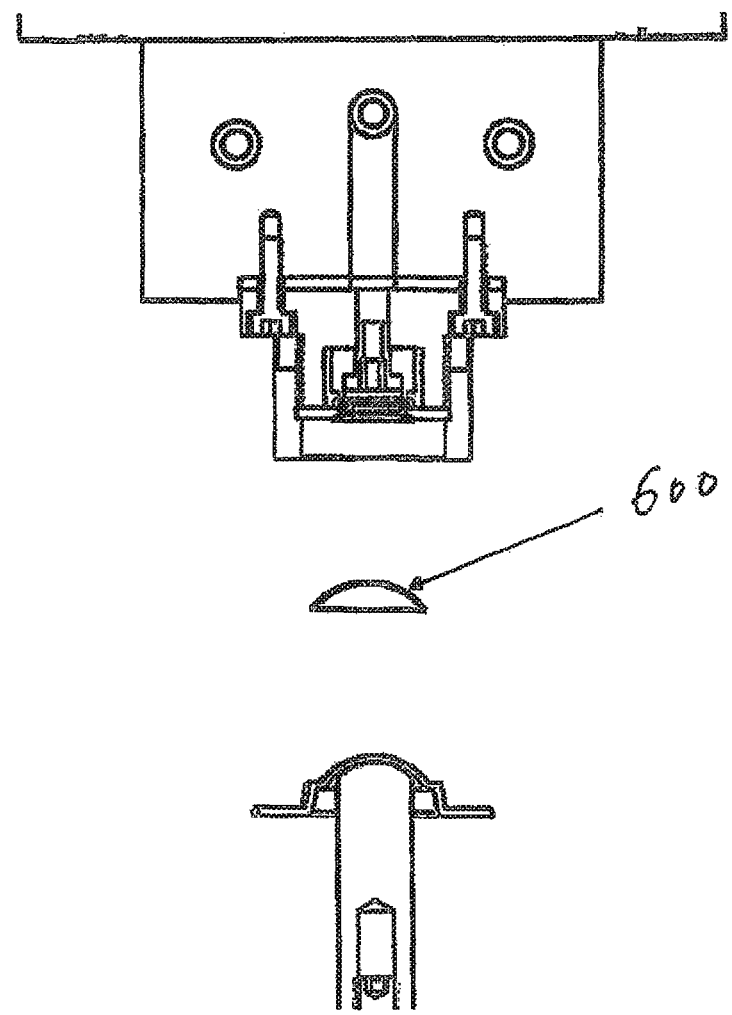
FIG. 7 Illustrates the contact lens drops off from the suction cup when the central channel is switched from vacuum to a compressed gas.

FIG. 7 Illustrates the contact lens drops off from the suction cup when the central channel switches from vacuum to compressed gas to blow the molded silicone hydrogel contact lens away from the suction cup.

Following the completed removal of the lens from the mold assembly, the lens may be subjected to further processing (e.g., extraction, hydration, any coatings or other treatments, sterilization and the like).

Note that the FIGS. 3-7 illustrate the process and apparatus for dislodging (delensing) a molded contact lens which is attached to a male mold half as an example. However, as mentioned above, it is possible to instead have the lens adhered to the female mold half during the demolding operation by applying the first deforming force against the non-optical surface of the male mold half instead of the female mold half. In this case, the process and apparatus can be used to dislodge (delens) a molded contact lens attached to a female mold half. For example, in the above description, the pin applies a force to the concave external surface (non-optical surface) of the male mold half to loosen the lens so that it can be removed by the suction cup. For dislodging (delensing) a molded contact lens attached to a female mold half, the pin will apply a force to the convex external surface (non-optical surface) of the female mold half instead, to loosen the lens from the female mold half so that it can be removed by the suction cup.

In another aspect, the invention is directed to An apparatus for delensing silicone hydrogel contact lenses from the lens adhering mold half, the apparatus comprising:

a mold half holder, wherein the mold half holder holding a molded silicone hydrogel contact lens seated on the top of one of the female mold half or the male mold half, a suction cup, wherein the suction cup connecting with the mold half holder and contacting the molded silicone hydrogel lens seated on the top of the mold half to which it is adhered, wherein the suction cup also connecting with a central channel which can be switched from vacuum pressure to compressed gas or vice versa, a pin-pushing device, wherein the pin-pushing device is located below the mold holder and has a pin; wherein the mold holder can be lowered to against the pin, thereby the pin deforms a surface of the one of the female mold half or the male mold half.

It is understood that methods of manufacturing mold halves for cast molding a contact lens are generally well known to those of ordinary skill in the art. The process of the present invention is not limited to any particular method of forming a mold half. In fact, any method of forming a mold half can be used in the present invention. However, for illustrative purposes, the above discussion has been provided as one embodiment of forming mold halves that can be used in accordance with the present invention.

Various embodiments are evident. Although one mold (FIG. 1) is illustrated, the invention is in no way limited to this specific mold. A person skilled in the art can readily determine other molds for which the invention has applicability.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A method for producing silicone hydrogel contact lenses, comprising:
    a) providing a mold including a male mold half having a first optical molding surface and a female mold half having a second optical molding surface, wherein the male and female mold halves are configured to receive each other such that a mold cavity is formed between the first and second molding surfaces when the mold is closed;
    b) dispensing an amount of a silicone hydrogel lens-forming material into the female mold half, wherein the silicone hydrogel lens-forming material comprises at least one silicone-containing vinylic monomer or at least one silicone-containing vinylic macromer or at least one silicone-containing prepolymer having ethylenically unsaturated groups;
    c) mating the male and female mold halves to close the mold;
    d) curing the silicone hydrogel lens-forming material located in the mold cavity, thereby forming a molded silicone hydrogel contact lens;
    e) separating the mold into the male and female mold halves, with the silicone hydrogel contact lens adhered on the male mold half;
    f) holding the molded silicone hydrogel contact lens attached to the male mold half with a vacuum supplied with a suction cup;
    g) with a pushing pin deforming the male mold half having the molded silicone hydrogel contact lens adhered thereon so as to separate the molded silicone hydrogel contact lens from the male mold half and to transfer the molded silicone hydrogel contact lens to the suction cup;
    h) moving the suction cup away from the pushing pin while the suction cup continues to hold the molded silicone hydrogel contact lens;
    i) applying a compressed gas to blow the molded silicone hydrogel contact lens away from the suction cup into a container;
    wherein the step of separating the mold into the male and female mold halves comprises:
    a) applying a restraining force to the female mold half with a first pry finger set for maintaining the female mold half in a fixed position; b) applying a force to a non-optical surface of the female mold half with a pin at a location about the center area of the non-optical surface of the female mold half to deform the female mold half thereby breaking the bonds between the second optical molding surface of the female mold half and the silicone hydrogel contact lens and c) applying a vertical lifting movement to the male mold half with a second pry finger set while maintaining the restraining-force on the female mold half so as to effectuate gradual separation between the female mold half and the male mold half.

2. The method of claim 1, wherein the force is applied to the non-optical surface of the female mold half with the pin at a location about the center area of the non-optical surface of the female mold half at an angle of less than about 30 degrees relative to a longitudinal axis of the mold.

3. The method of claim 2, wherein the force is applied to the non-optical surface of the female mold half with the pin at a location about the center area of the non-optical surface of the female mold half at an angle of less than about 10 degrees relative to the longitudinal axis of the mold.

4. The method of claim 2, wherein the force is applied to the non-optical surface of the female mold half with a pin at the location about the center area of the non-optical molding surface of the female mold half at an angle of less than about 5 degrees relative to the longitudinal axis of the mold.

5. The method of claim 1, wherein the silicone hydrogel able lens-forming material is polymerized by thermal curing.

* * * * *